United States Patent [19]
Galbraith

[11] Patent Number: 6,145,246
[45] Date of Patent: Nov. 14, 2000

[54] KEYED VINEYARD CROSS-ARM

[76] Inventor: John M. Galbraith, P.O. Box 216, San Leandro, Calif. 94577

[21] Appl. No.: 08/526,181

[22] Filed: Sep. 11, 1995

[51] Int. Cl.[7] .................................................... A01G 17/06
[52] U.S. Cl. ...................................................................... 47/46
[58] Field of Search ...................................................... 47/46

[56] References Cited

U.S. PATENT DOCUMENTS

| | | | |
|---|---|---|---|
| 3,690,033 | 9/1972 | Lewis et al. ................................ | 47/46 |
| 3,791,070 | 2/1974 | Roberts ....................................... | 47/46 |
| 4,023,307 | 5/1977 | Clark et al. ................................. | 47/46 |
| 4,329,811 | 5/1982 | Coulson ...................................... | 47/46 |
| 5,063,709 | 11/1991 | Whittaker .................................... | 47/46 |
| 5,966,867 | 10/1999 | Downer et al. .............................. | 47/46 |

*Primary Examiner*—Michael J. Carone

[57] ABSTRACT

A grapevine trellis system utilizing substantially L-shaped wire supporting bracket arms constructed to be universally mounted on solid T-bar posts or metal roll formed T-shaped posts incorporating vertical slots designed to eliminate unwanted flexing of the assembly.

1 Claim, 2 Drawing Sheets

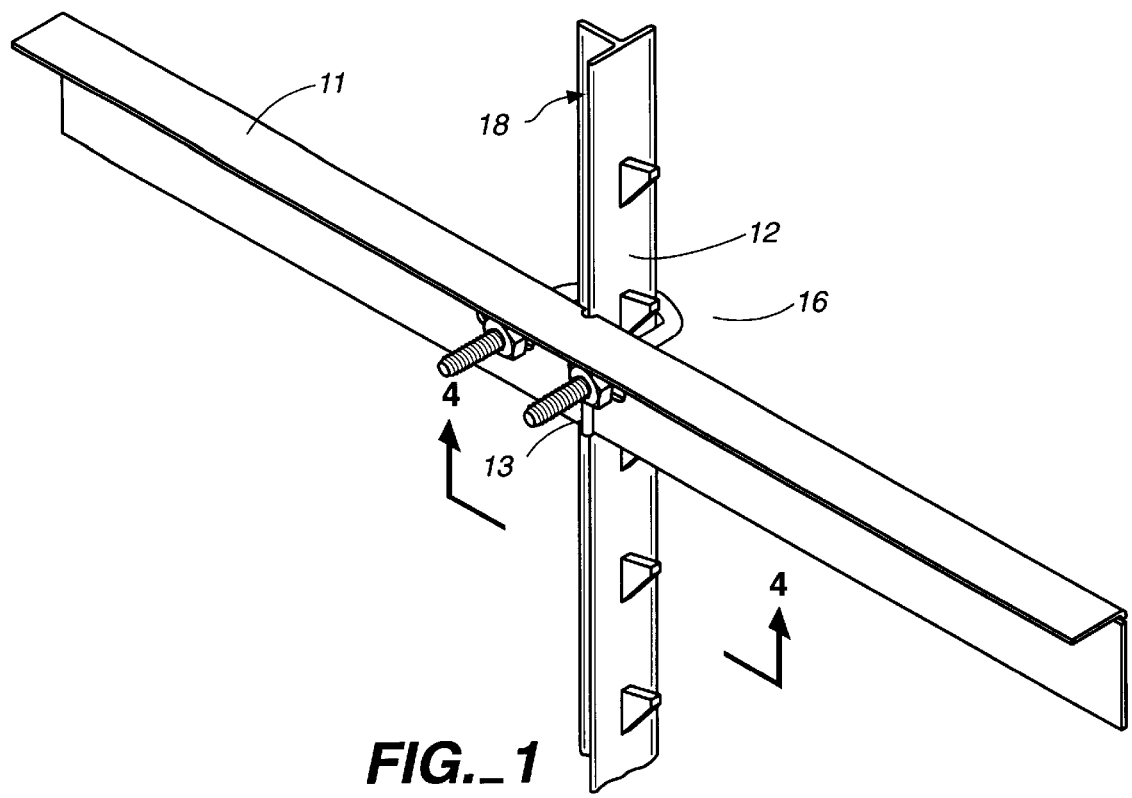
FIG._1
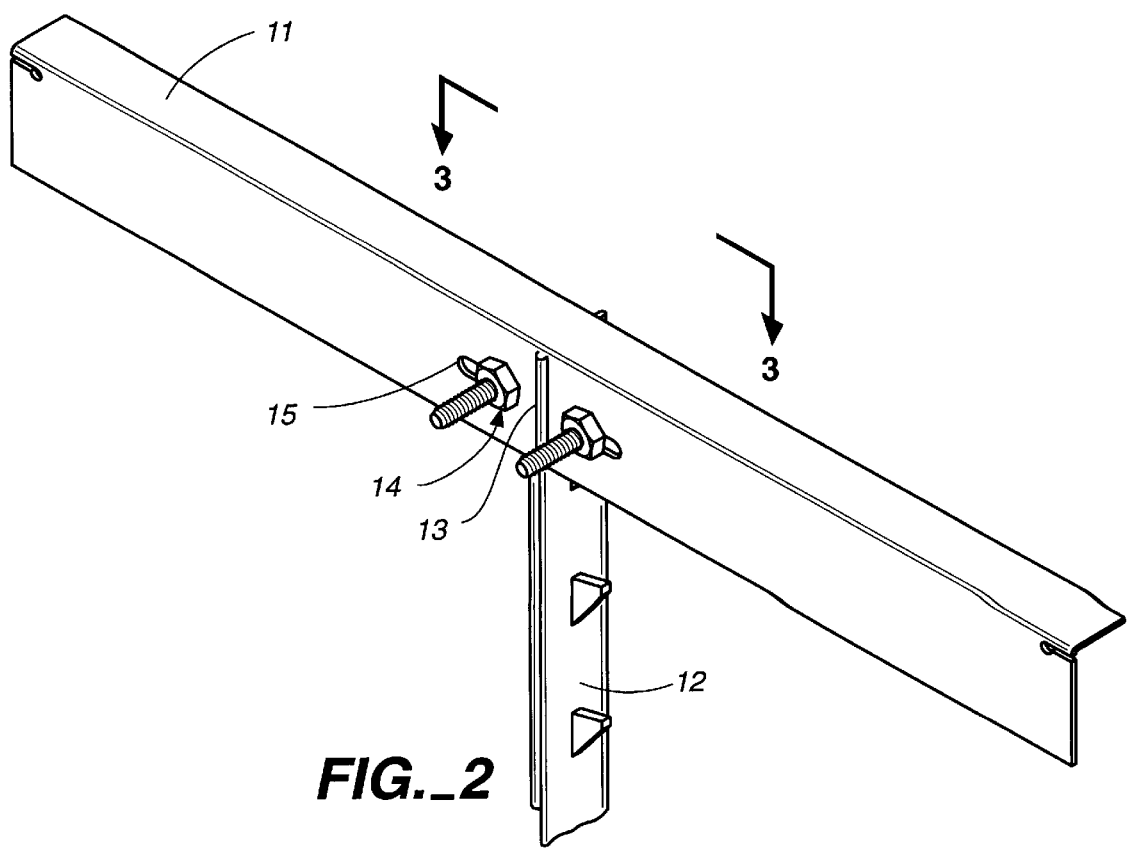
FIG._2

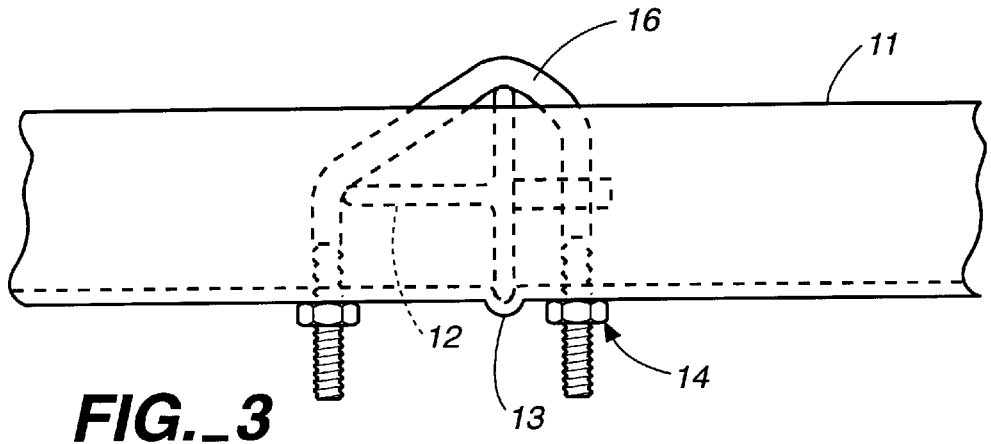
FIG._3
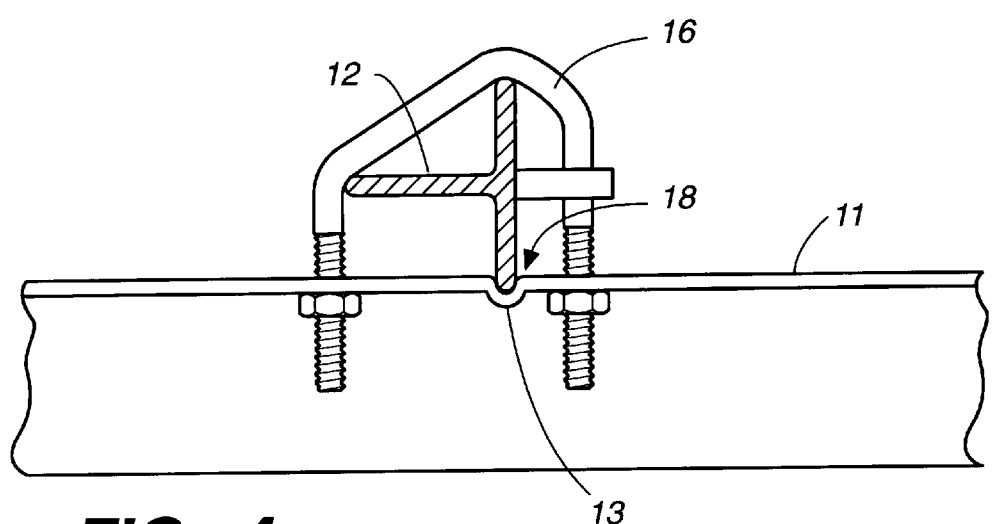
FIG._4
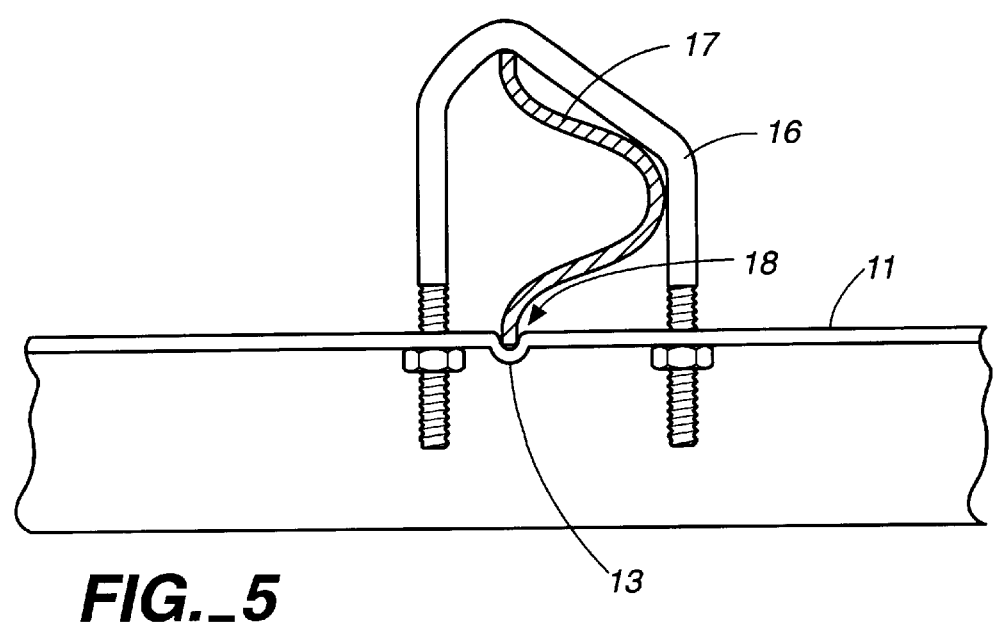
FIG._5

KEYED VINEYARD CROSS-ARM

BACKGROUND OF THE INVENTION

1. Field of the Invention

This invention relates to an improved vineyard trellis system and, in particular, a trellis system incorporating specially constructed and arranged bracket arms for mounting on vertical posts for supporting parallel trellis wires which in turn support the grapevines as the plant matures and grows to full height over a period of years.

2. Description of Relevant Art

Originally wooden posts were used in the vineyard industry to support horizontal wires which in turn supported grape vines. To spread the vines outwardly, wooden or metal cross-arms were nailed to the wooden post providing a solid support for the vines. With the advent of metal grape stakes and "T" posts, which have taken over the vineyard uprights, attaching metal cross-arms to the metal posts presented problems, one of which was the flexing of the cross-arm due to the configuration of the metal upright.

SUMMARY OF THE INVENTION

A primary object of the present invention is to provide a product designed to engage the horizontal cross-arm with the vertical "T" post or roll-formed grape stake in a keyed-in manner to prevent unwanted movement.

BRIEF DESCRIPTION OF THE DRAWINGS

FIG. 1 is a perspective view of the cross-arm showing mounting at any level on a "T" post.

FIG. 2 shows the cross-arm mounted at the top of a "T" post.

FIG. 3 shows the bolt location for mounting on a "T" post as in FIG. 2.

FIG. 4 shows the bolting arrangement for locating the cross-arm at any position on the "T" post as in FIG. 1.

FIG. 5 shows the bolt attachment for a roll-formed grape stake.

DETAILED DESCRIPTION OF THE DRAWINGS

This trellis wire support system is designed to engage the horizontal vineyard cross-arm 11 with the vertical "T" post 12 or roll-formed grape stake 17 in such a way as to hold the cross-arm to the upright in a rigid manner eliminating the undesirable flexing by utilizing the tongue and groove principle. Grooves 13 pressed vertically into the center section of the horizontal cross-arm form a slot in which a rib 18 of the upright stake or "T" post is encased, preventing the cross-arm from independent movement. The cross-arm and vertical support are held together with a "U" bolt 15 which bolt slips around the upright, thru holes 15 punched into the cross-arm and is secured with two nuts 14 which are tightened as required to hold the structure rigidly in place which action "locks" the cross-arm to the upright.

As illustrated in FIGS. 3, 4, & 5 the grooves 13 pressed into the cross-arm 11 engage the vertical flange of the upright 12 so that when secured with the "U" bolt 15 and nuts 14, unwanted cross-arm movement is eliminated.

The entire vertical width of the cross-arm engages the upright stake making for a strong durable component. The section is not weakened by cutting through the axis of the cross-arm. Ease of installation is a salient feature resulting in labor savings and convenience.

The primary use of this novel means of attachment is to eliminate unwanted movement of the horizontal cross-arm on the vertical grape stake or "T" post.

What is claimed:

1. A trellis wire support system comprising in combination:

an elongated upright support member terminating in a top end surface; a first elongated cross-arm member having not notches at each end for accepting trellis wires and adapted to be secured to the upright support, the cross-arm member formed by two legs creating and L-shape, one leg having an exterior side facing in a direction opposite to the second leg, and an interior side facing in a direction of the second leg, a groove formed in the exterior side of the one leg; a second elongated cross-arm member having notches at each end for accepting trellis wires and adapted to be secured to the upright support, the cross arm member formed by two legs creating an L-shape, one leg having an exterior side facing in a direction opposite to the second leg, and an interior side facing in a direction of the second leg, a groove formed in the interior side of the one leg; a U-shaped clamp for clamping the cross-arm member to the upright support member;

wherein when assembled, the groove of the first cross-arm member receives a portion of the upright support member at a location spaced from the top end, the second leg of the first cross-arm member extending away from the upright support member;

and the groove of the second cross-arm member receives a portion of the upright support member at the top end;

the second leg of the second cross-arm member resting on the top end surface of the upright support.

* * * * *